United States Patent [19]
Cosby

[11] Patent Number: 5,626,459
[45] Date of Patent: May 6, 1997

[54] UNITARY TURBINE/COMPRESSOR ENGINE

[76] Inventor: Thomas L. Cosby, 1639 E. 84th Pl., Chicago, Ill. 60617

[21] Appl. No.: 610,673

[22] Filed: Mar. 4, 1996

Related U.S. Application Data

[63] Continuation of Ser. No. 304,869, Sep. 13, 1994, abandoned, which is a continuation-in-part of Ser. No. 959,435, Oct. 13, 1992, abandoned.

[51] Int. Cl.$^6$ ...................................................... F04D 25/04
[52] U.S. Cl. ................... 415/143; 415/199.6; 416/198 A; 417/409; 60/651; 60/671
[58] Field of Search ................................... 60/641.1, 650, 60/651, 671; 415/143, 199.6; 416/198 R, 198 A, 175; 417/409

[56] References Cited

U.S. PATENT DOCUMENTS

| | | | |
|---|---|---|---|
| 3,182,710 | 5/1965 | Mount | 417/409 |
| 3,287,901 | 11/1966 | Tauer | 60/641.1 |
| 4,663,939 | 5/1987 | Cosby | 60/650 |
| 5,107,682 | 4/1992 | Cosby | 60/650 |

OTHER PUBLICATIONS

Van Wylen, Gordon and Sonntag, Richard, "Fundamentals of Classical Thermodynamics", 1985, p. 136.

*Primary Examiner*—James Larson
*Attorney, Agent, or Firm*—Wood, Phillips, VanSanten, Clark & Mortimer

[57] ABSTRACT

A work reducing composite engine system that uses ambient air for a primary energy source. The device consists of a unitary turbine/compressor assembly utilizing a turbine for producing work output and a downstream compressor for receiving fluid exhaust of the turbine and for compressing the turbine exhaust. An internal heat exchanger is provided between the turbine and the compressor so that fluid in the compressor is cooled, thereby reducing compression work requirements and the turbine exhaust is heated by the compressor, thereby decreasing input heat requirements.

14 Claims, 2 Drawing Sheets

UNITARY TURBINE/COMPRESSOR ENGINE

CROSS-REFERENCE

This application is a continuation of application Ser. No. 08/304,869, filed Sep. 13, 1994, abandoned, which is a continuation-in-part of Ser. No. 07/959,435 filed Oct. 13, 1992, entitled "Unitary Turbine/Compressor Engine" abandoned.

BACKGROUND OF THE INVENTION

1. Field of the Invention

This invention relates to work producing cycles and, more particularly, to a high efficiency system with a working fluid that uses ambient conditions as a primary heat source and an internal heat exchange mechanism with a turbine and compressor wherein cool turbine exhaust is used to reduce compressor work and turbine exhaust is reheated by compression heat and the compressor and turbine are a unitary structure.

2. Background Art

A conventional system for developing a power cycle typically comprises a boiler, turbine, condenser and pump. Heat is supplied to the boiler by a fossil fuel to convert an operating fluid into a high pressure vapor or gas for use as the working medium. The vapor is expanded in the turbine to produce a work output. In a heat rejection mechanism for the cycle, exhaust vapor from the turbine enters the condenser wherein sufficient heat is removed to condense the vapor. Saturated liquid is delivered to a pump, which raises the pressure to the saturation pressure corresponding to the boiler temperature and thereafter the liquid is delivered to the boiler where the cycle repeats.

Standard systems use a heat source and heat sink to establish a temperature gradient to create heat flow. With a temperature differential created, a working fluid is caused to flow as a result of pressure and/or volumetric differential.

The applicability of any system hinges on the efficiency of the cycle. One apparent flaw in prior art systems is the fact that high work input is a necessary result of creating a differential by developing very high pressures and temperatures through the addition of heat. Generally, in prior art systems, the amount of work required to compress the vapor back to its saturation pressure has been greater than the work extracted from the system through the turbine. The work input that is required to compress the vapor is functionally dependent upon a temperature differential established to generate heat flow in the system. Heretofore, efforts have been made to improve efficiency by utilizing latent or waste heat to reduce heat input.

U.S. Pat. No. 5,107,682 issued Apr. 28, 1992, to applicant, discloses an invention aimed at solving the shortcomings of prior art power cycle systems by using fluid exhaust of the turbine to cool the fluid of the compressor. While this invention yields an extraordinarily high efficiency, non-polluting cycle, further enhancement of heat exchange between the compressor and turbine exhaust and greater structural simplicity was sought.

SUMMARY OF THE INVENTION

The present invention contemplates input heat reduction by using ambient air as a primary heat source. Whereas prior art power cycles heat an operating fluid above ambient temperature to produce a temperature differential, the present invention contemplates a cycle wherein the working fluid is maintained at or near ambient temperature. Accordingly, the heat input is substantially reduced over the input required in conventional power cycle systems.

An objective of the present invention is to provide a system wherein the operating medium is pressurized in the cycle while consuming a minimal amount of the work produced by expansion of the operating medium. To accomplish this end, vapor is cooled during the compression portion of the cycle simultaneously as compression of the operating medium is being carried out. As a result, compression work is minimized.

The invention further contemplates a unitary turbine/compressor structure wherein the fluid exhaust of the turbine is used to cool the compressor and the compressor heats the fluid exhaust to a temperature above the temperature at which it is exhausted from the turbine, reducing heat input requirements between the fluid exhaust and the compressor. The unitary turbine/compressor simplifies the fluid circuit mechanics and minimizes energy loss to friction.

The fluid circuit of the present invention includes a unitary turbine and compressor assembly. The unitary assembly includes a turbine for producing a work output in which a working fluid comes in at an incoming temperature and pressure and is exhausted at a first temperature and pressure below the incoming temperature and pressure. A compressor downstream of the turbine receives the fluid exhaust of the turbine and compresses the fluid exhaust. A structure for facilitating heat exchange between the fluid exhaust and the compressor is provided so that fluid in the compressor is cooled and the fluid exhaust is heated by the compressor to a temperature above the first temperature. The fluid circuit further includes a reservoir and conduits for delivering fluid compressed by the compressor to the reservoir and from the reservoir to the turbine.

More specifically, the fluid circuit includes a heat exchanger to effect heat exchange between the reservoir and a supplemental energy source, as necessary, to maintain the circuit in continuous operation and flow control structures such as valves, etc. The structure for exchanging heat between the fluid exhaust and the compressor is a partition defining in part a compression chamber and further defining in part a tortuous path for the fluid exhaust to facilitate or effectuate heat exchange prior to flow of the fluid exhaust into the compression chamber.

DETAILED DESCRIPTION OF THE DRAWINGS

Figure 1:
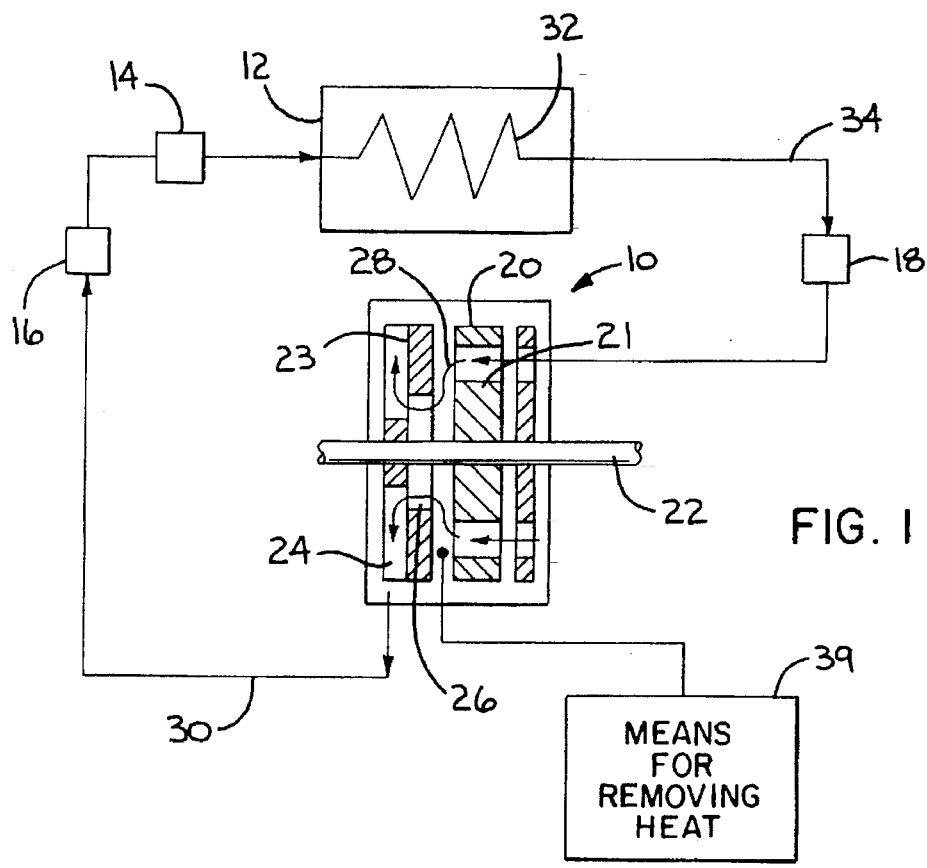
FIG. 1 is a schematic representation of a system for producing a power cycle according to the invention.

Referring initially to FIG. 1, a system for producing a power cycle is shown schematically and includes a unitary turbine/compressor assembly 10 and a high pressure reservoir 12. The system further includes a work input 14 for providing the system with any required work or heat to keep the system in continuous operation. The work input 14 may be placed throughout the system, and where needed, and the placement of the work input 14 is not definitive, only illustrative. Valves 16,18 are installed throughout the system to control the direction of the fluid flow.

The unitary turbine/compressor assembly 10 includes an impulse turbine 20 having a turbine impeller 21 keyed to a drive shaft 22, the turbine impeller 21 being mechanically linked to a compressor impeller 23 of a centrifugal compressor 24, whereby the centrifugal compressor 24 is driven by the impulse turbine 20. A fluid conduit/heat exchanger 26 provides a path for fluid exhaust from the turbine 20 to reach the compressor 24 as illustrated by the arrow 28.

To initiate a cycle, the entire system is first evacuated. A pressurized fluid is injected into the system in sufficient volume to maintain working pressure until the compressor begins returning pressurized vapor. A suitable fluid for use in the system is R-22 refrigerant. Pressurized vapor is delivered through the valve 16 and conduit 30 to the reservoir 12. The high pressure reservoir 12 has a heat exchanger 32 to equalize the temperature within the high pressure reservoir 12 and the ambient temperature.

From the high pressure reservoir 12 the fluid is delivered through the conduit 34 and valve 18 to the unitary turbine/compressor assembly 10 and, more particularly, to the turbine 20. In the turbine 20 the fluid is expanded to produce work through rotation of the turbine impeller 21. Work is extracted by any number of conventional power takeoff devices connected as by drive shafts (not shown) to the turbine drive shaft 22. Fluid exhaust from the turbine 20 is delivered through the fluid conduit/heat exchanger 26 to the compressor 24. The fluid exhaust from the turbine 20 is at a lower temperature than the fluid in the compressor. Thus, the fluid conduit/heat exchanger 26 functions both to warm the fluid exhaust and to cool the compressor 24.

The compressor 24 pressurizes the fluid exhaust from the turbine 20 by means of the compressor impeller 23 and delivers the same to the high pressure reservoir 12 through the conduit 30 and the valve 16 for completion of the fluid circuit.

Figure 2:
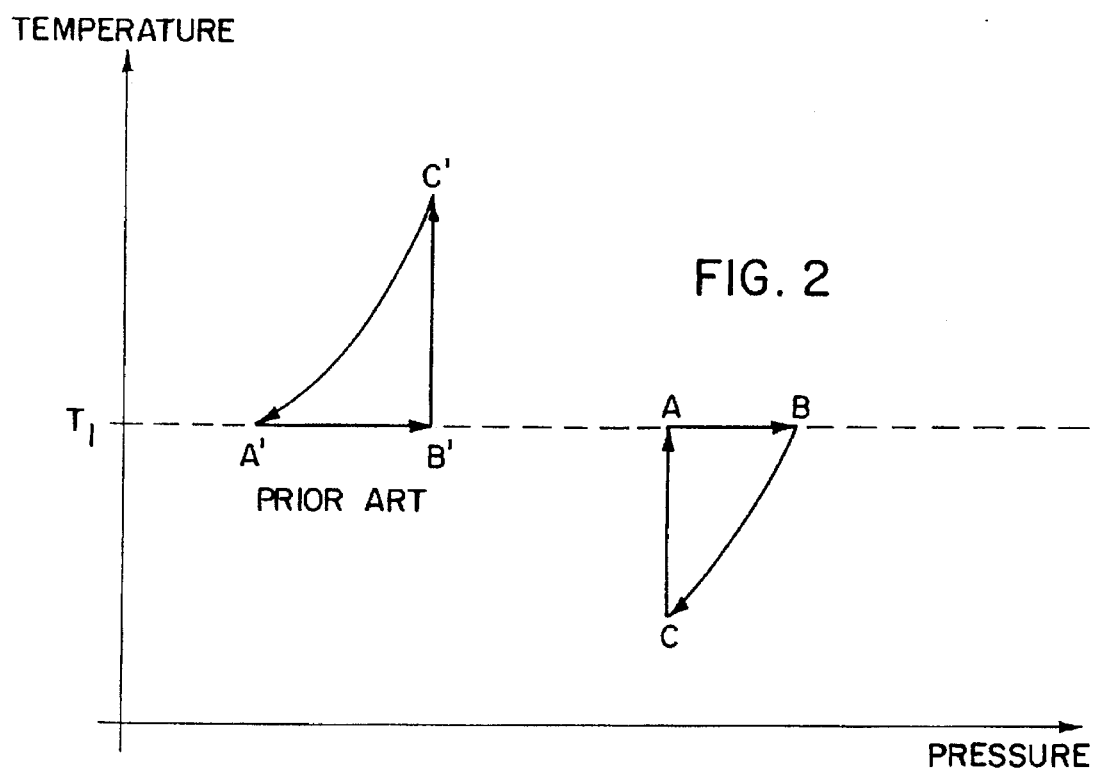
FIG. 2 is a graphical representation of pressure versus temperature for a prior art power producing cycle and a power producing cycle according to the invention.

The cycle of FIG. 1 is illustrated graphically in FIG. 2, with the temperature represented on the Y axis and the pressure on the X axis. Line A-B represents the compression stage, which occurs at a constant temperature, T1 or ambient temperature. Expansion in the turbine is indicated by the line B-C. Compressor cooling and reheating of the turbine exhaust is accomplished through heat exchange between the fluid output of the turbine and the compressor, and through heat exchange with ambient air as indicated by the line C-A. Any additional heat removal necessary to maintain a constant temperature during compression can be accomplished by a means 39 (FIG. 1), which acts as a low temperature reservoir.

Flow of cooled turbine exhaust lowers the temperature of the compressor and fluid vapor to minimize enthalpy increase and thereby work input. The temperature of the fluid throughout the cycle is maintained generally at or near ambient temperature. Consequently, the work input to the system to establish this equilibrium, if required, is less than that required in a conventional system.

In the prior art cycle, e.g., a Rankin cycle, compression is accomplished by a pump. The compression stage is represented in FIG. 2 as line A'-B'. To establish a temperature differential, the prior art system is heated as by the burning of a fossil fuel to elevate the temperature from point B' to point C' at constant pressure. Fluid expansion is shown as line C'-A'. Substantial heat input is required to pressurize the fluid to the temperature at point C'.

Figure 3:
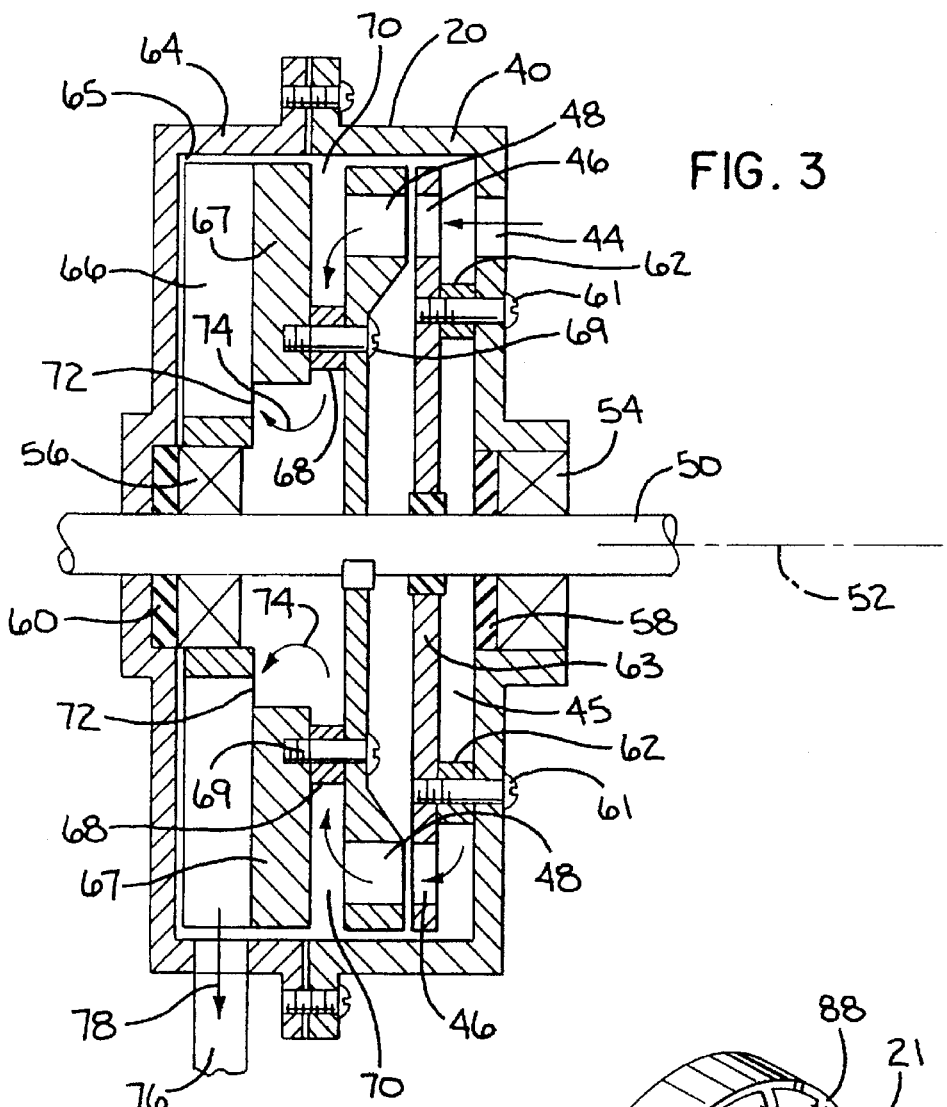
FIG. 3 is a cross-sectional schematic representation of the unitary turbine/compressor assembly of the present invention.

The unitary turbine/compressor assembly 10 is shown schematically in more detail in FIG. 3. The turbine portion 20 includes a housing 40. A vapor input 44 supplies high pressure fluid from the pressure reservoir 12 to the manifold 45. Nozzles 46 direct the high pressure fluid from the manifold 45 onto blades 48 of the impulse turbine impeller 21. The turbine/impeller 21 is attached to the drive shaft 22 by a keyed connection 51. The drive shaft 22 is maintained in place about the axis 52 by ball bearing assemblies 54,56. Fluid is prevented from leaking from the system about the periphery of the drive shaft 22 by seals 58, 59 and internally by the shaft seal 60. Screws 61 and spacers 62 maintain a partition 63 in place, the partition defining in part the manifold 45 (along with the housing 40) and the nozzles 46.

The compressor 24 is juxtaposed axially of the turbine 20. The compressor impeller 23 is fastened coaxially about the axis 52 to the turbine/impeller 21 by the screws 64 and the spacers 65. A housing 66 defines in part a compression chamber 67 within which compressor impeller blades 68 resides. The thermally conductive partition 69 forms in part the compressor impeller 23 and, along with the housing 66, the compression chamber 67. The partition 69 further defines, along with the turbine impeller 21, a fluid exhaust passage 70 for the flow of fluid exhaust from the turbine 20 to the compressor inlet 72 along the path illustrated by the arrows 74. As seen in FIG. 3, the fluid exhaust passage 70 is tortuous. Compressed fluid leaves the compressor 24 through the outlet 76 as illustrated by the arrow 78.

Following expansion of the high pressure fluid entering the turbine 20, fluid exhaust, which is at a temperature and pressure less than the fluid input into the turbine, is exhausted into the passage 70. The fluid exhaust passing through the tortuous path of the passage 70 is in heat exchange relationship with the compressor 24 through the thermally conductive wall 69. The thermally conductive wall 69 acts as a heat exchanger transferring heat from the compressor 22 to the fluid exhaust, thereby warming the fluid exhaust prior to input into the compressor chamber 67 and cooling the compressor 24.

Figure 4:
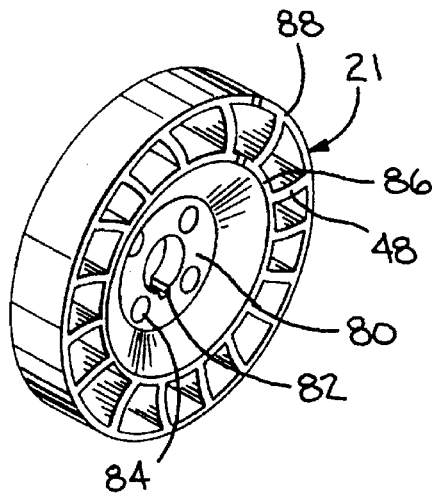
FIG. 4 is a perspective view of the turbine impeller of FIG. 3.

The impulse turbine impeller 21 is illustrated in more detail in FIG. 4. The turbine impeller has hub 80 with a notch 82 for keyed connection to the shaft 22. The hub 80 also has four radially spaced holes 84 through which the screws 64 pass to connect the turbine impeller 21 to the compressor impeller 23. The turbine impeller blades 48 are between an inner blade wall 86 connected to the hub 80 and an outer blade wall 88.

Figure 5:
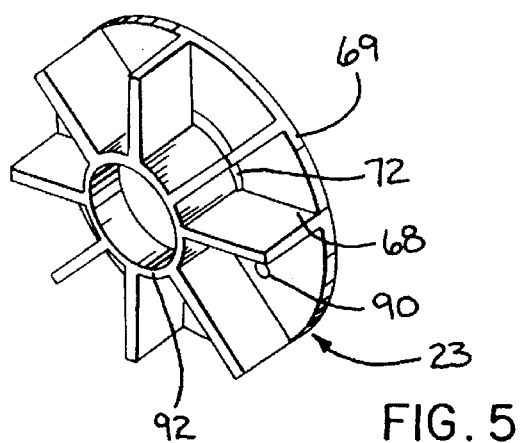
FIG. 5 is a perspective view of the compressor impeller of FIG. 3.

As seen in FIG. 5, the compressor impeller 23 includes the thermally conductive partition 69. The thermally conductive partition 69 has four holes 90 (two shown) for receiving the screws 64. The compressor 24 further includes a collar 92 which receives the shaft 22. The blades 68 radiate from the collar 92 and are joined to the thermally conductive partition 69. The compressor inlet 72 is defined between the collar 92 and the thermally conductive partition 69.

The unitary turbine/compressor engine of the present invention is characterized by extraordinarily high efficiency and as being non-polluting and operable without exhaustion of finite resources. The centrifugal compressor has a high speed impeller directly linked to the turbine impeller. In this manner, mechanical linkages which could cause loss of system energy through friction are eliminated. In addition, the system is simplified by eliminating such mechanical linkages. The juxtaposition of the compressor and the turbine permits the fluid exhaust from the turbine to be in direct heat exchange relationship with the compressor. In this manner, cool turbine exhaust reduces compressor work and turbine exhaust is reheated by heat generated by the compressor, thereby minimizing system heat losses and facilitating efficient heat exchange between the turbine and compressor.

I claim:

1. A unitary turbine and compressor assembly, the assembly comprising:

a turbine for producing a work output having means for causing expansion of a working fluid at an incoming temperature and pressure and exhausting the working fluid at a first temperature and pressure below said incoming temperature and pressure;

a compressor downstream of the turbine, the compressor receiving the fluid exhaust of the turbine for compression thereby; and heat exchange means between the fluid exhaust and the compressor so that fluid in the compressor is cooled and the fluid exhaust from the turbine is heated by the compressor through heat exchange therewith to a temperature above the first temperature.

2. The unitary turbine and compressor assembly according to claim 1 wherein the heat exchange means between the turbine and the compressor comprises a partition defining at least part of a compression chamber for the compressor, the partition further defining at least part of a path for the fluid exhaust prior to flow of the fluid exhaust into the compression chamber.

3. The unitary turbine and compressor assembly according to claim 2 wherein the partition defines at least part of a tortuous path for the fluid exhaust.

4. The unitary turbine and compressor assembly according to claim 1 wherein the compressor is a centrifugal compressor.

5. The unitary turbine and compressor assembly according to claim 1 further comprising means connecting the turbine to drive the compressor.

6. The unitary turbine and compressor assembly of claim 2 wherein the compressor comprises an impeller having a radial wall with a plurality of blades extending axially and radially inward therefrom, the radial wall being the partition.

7. The unitary turbine and compressor assembly of claim 1 wherein the compressor and turbine are combined within a single housing.

8. The unitary turbine and compressor assembly of claim 1 wherein the turbine comprises an impeller and the compressor comprises an impeller, the turbine impeller and the compressor impeller being attached to each other so that they rotate about the same axis and the turbine impeller drives the compressor impeller.

9. A unitary turbine and compressor assembly comprising:

a housing;

a turbine mounted within the housing for producing a work output having an impeller rotationally driven by expansion of a working fluid at an incoming temperature and pressure, said working fluid being exhausted from said turbine at a first temperature and pressure below said incoming temperature and pressure;

a compressor within the housing downstream of the turbine, the compressor having an impeller attached coaxially to the turbine impeller so that the compressor impeller is rotationally driven by the turbine impeller, the compressor receiving the fluid exhaust of the turbine for compression thereby; and means for heat exchange between the fluid exhaust and the compressor so that fluid in the compressor is cooled and the fluid exhaust is heated by the compressor through heat exchange therewith to a temperature above the first temperature.

10. The unitary turbine and compressor assembly of claim 9 wherein said heat exchange means comprises a partition defining at least part of a compression chamber for the compressor, the partition further defining at least part of a path for the fluid exhaust prior to flow of the fluid exhaust into the compression chamber.

11. The unitary turbine and compressor assembly of claim 10 wherein the partition defines at least part of a tortuous path for the fluid exhaust.

12. The unitary turbine and compressor assembly of claim 11 wherein the compressor impeller comprises a radial wall with a plurality of blades attached thereto, the heat exchange means comprising the partition.

13. The unitary turbine and compressor assembly of claim 10 wherein the compressor impeller comprises a radial wall with a plurality of blades attached thereto, the partition comprising the radial wall.

14. The unitary turbine and compressor assembly of claim 9 further comprising a drive shaft coaxially fixed to the turbine impeller for conveying a work output from the unitary turbine and compressor assembly.

* * * * *